Thos. Silliman.
Animal Trap.
No. 71543
Patented Nov 26 1867
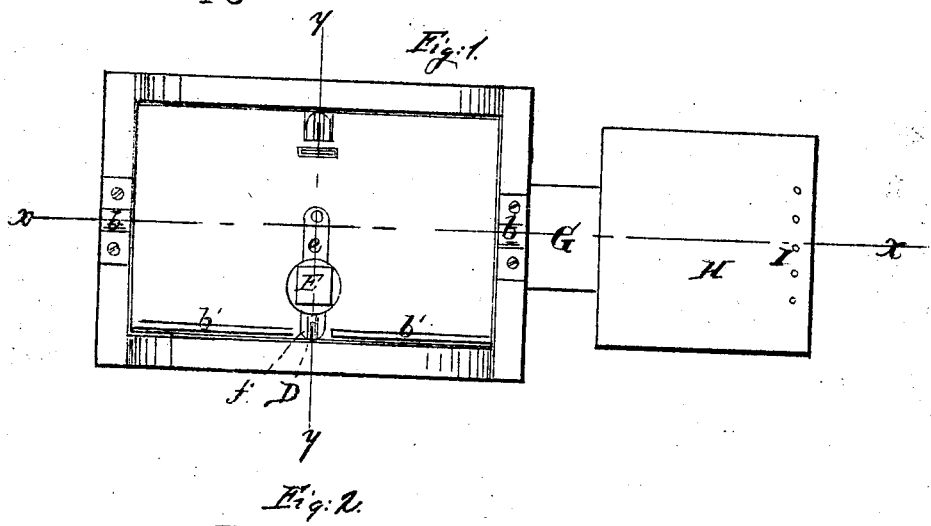
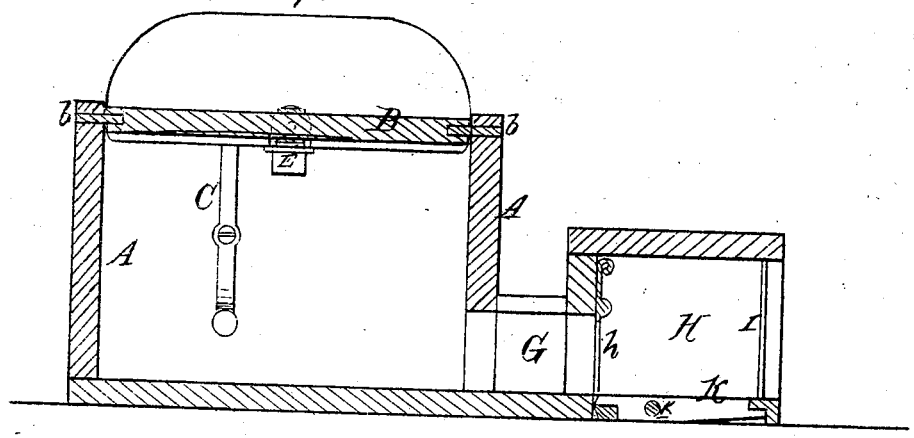
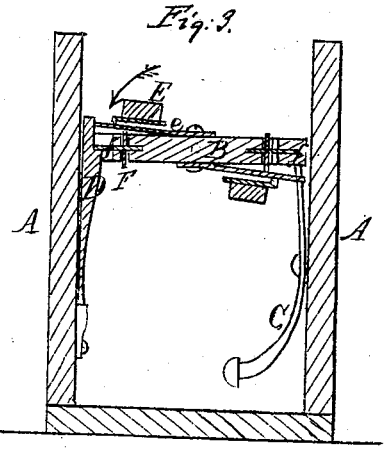
Witnesses:
Inventor:
Thos. Silliman
by his Atty
Baldwin & Bair

United States Patent Office.

THOMAS SILLIMAN, OF THREE RIVERS, MICHIGAN.

Letters Patent No. 71,543, dated November 26, 1867.

---

IMPROVED ANIMAL-TRAP.

---

*The Schedule referred to in these Letters Patent and making part of the same.*

---

TO ALL WHOM IT MAY CONCERN:

Be it known that I, THOMAS SILLIMAN, of Three Rivers, in the county of St. Joseph, and State of Michigan, have invented certain new and useful Improvements in Animal-Traps, of which the following is a full, clear, and exact description, reference being had to the accompanying drawings, which make part of this specification, and in which—

Figure 1 represents a plan or top view of my improved trap,

Figure 2 a vertical longitudinal central section through the same, at the line $x\ x$ of fig. 1, and Figure 3 a vertical transverse section, at the line $y\ y$ of fig. 1.

To carry out my invention, I construct a box, A, of suitable size and material, having a turn-table or trap-door, B, on top, turning on pivots, $b$, and so arranged as to remain balanced in a horizontal position. This table always tips or turns in the direction indicated by the arrow in fig. 3, being prevented from turning the other way by a balanced stop-lever, C, underneath it. A spring, D, also holds up the tipping side of the table until the proper moment for its release. The table makes a half turn each time it is sprung, so that the bottom becomes the top, and *vice versa*. The bait E is placed on a bifurcated lever, $e$, pivoted on the table so as to play slightly horizontally. The fork of this lever embraces the spring D, which has a shoulder upon it. A friction-roller, F, on which the lever $e$ moves, is mounted on a bearing-pin, $f$, which projects into a notch cut in the edge of the table, and rests on the shoulder of the spring D. A device, similar to the one described, is arranged on the under opposite side of the turn-table, so that, when it turns over, the under one may occupy the place of the other. A passage, G, leads from the box A to a cage, H, having a grating, I, at the far end. The bottom K of this cage tips on a pivot, $k$. A door, $h$, is hinged at top, so as to lift or swing inwards into the cage. This door is placed at the point where the passage enters the cage, and has a small opening in it, for a purpose hereinafter described.

The following is a description of the working of the trap: The trap is properly baited, and set in the position shown in the drawings. The animal springs upon the table B, and seizes the bait E, the slightest pull upon which causes the lever $e$ to move sidewise on its friction-roller, and thus release the spring D, when the table B instantly revolves a half turn, precipitating the animal into the box A. As soon as the forks of lever $e$ pass over the spring D, it resumes its former position, and, when the table has made its semi-revolution, the pin $f$ strikes on the shoulder of the spring, and the trap is again set. A small ledge, $b'$, is formed on the upper tipping edge of each side of the table. If the animal puts his feet on this ledge, his weight will tip the table even more quickly than it otherwise would. When the animal drops into the box A, he sees the light through the hole in the door $h$, and enters the passage G. In practice, I prefer to make this passage much longer than it is shown in the drawings. The animal goes through the passage G, and pushes open the door $h$, (which closes after him,) and enters the cage H. He naturally goes to the grating I, when his weight causes the bottom K of the cage to open, and drops him into a vessel containing water, and drowns him. He may, if preferred, be retained in the trap by securing the bottom. I thus secure an effective, self-setting trap, and one by which the animals can either be destroyed as fast as caught, or retained alive, as may be desired.

What I claim as my invention, and desire to secure by Letters Patent, is—

1. The combination with the revolving table of the bait-lever, the holding-spring D, and the friction-roller F, when all these parts are constructed and arranged as described for joint operation.

2. The combination of the table, the bait-lever, and the holding-spring with the balanced stop-lever C, constructed, arranged, and operating as described.

3. The combination of the revolving table, the bait-lever, the holding-spring, and the balanced stop-lever with the box A, the passage G, the swinging door $h$, the cage H, and the tipping-floor K, when all these parts are constructed and arranged as described for joint operation.

In testimony whereof, I have hereunto subscribed my name.

THOS. SILLIMAN.

Witnesses:
WM. GRIFFITHS,
L. C. MORSE.